United States Patent Office 3,070,078
Patented Dec. 25, 1962

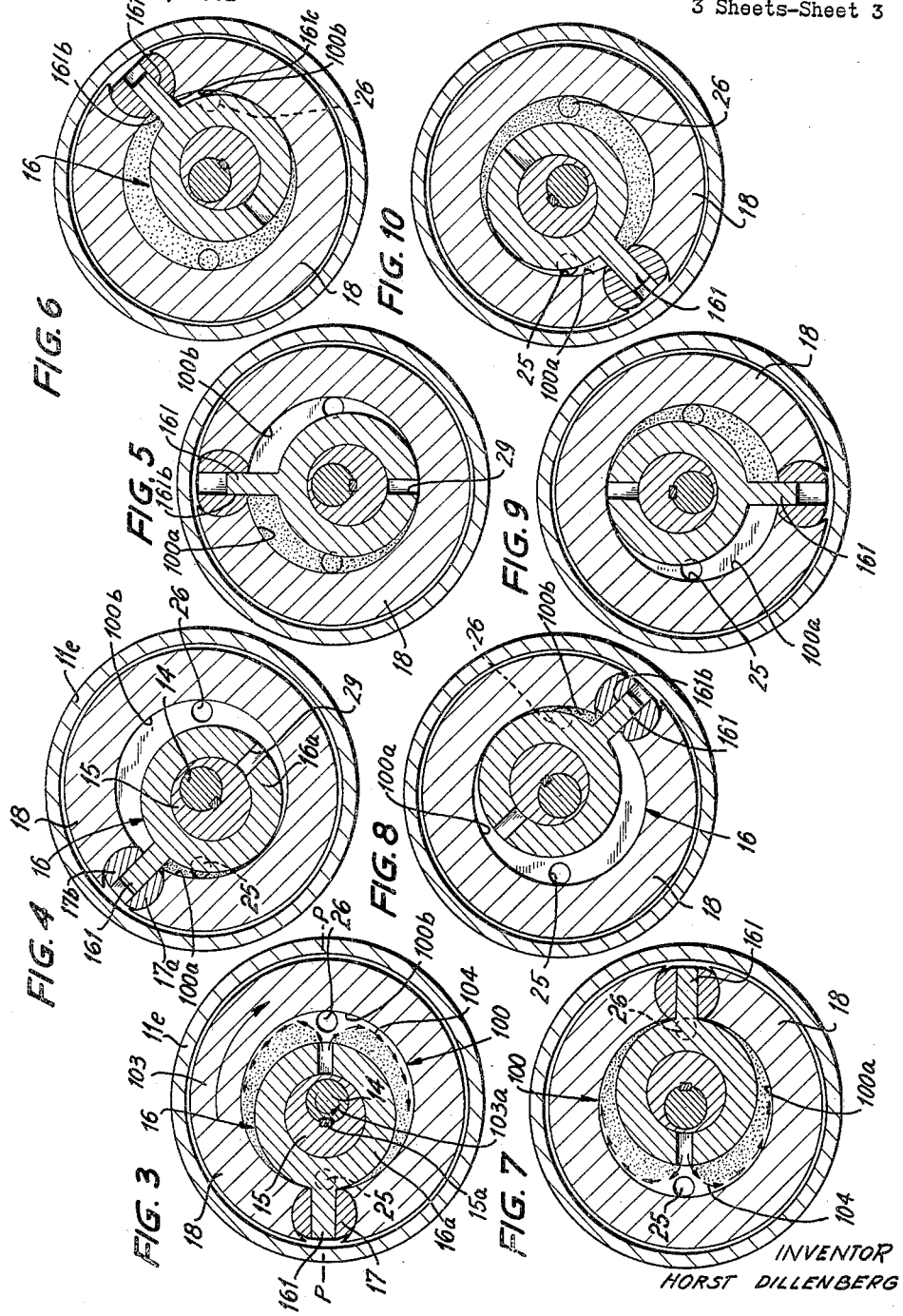

3,070,078
ROTARY PISTON ENGINE
Horst Dillenberg, Koniggratzer Strasse 25,
Haan, Rhineland, Germany
Filed Nov. 8, 1961, Ser. No. 151,045
18 Claims. (Cl. 123—8)

The present invention relates to internal combustion engines in general, and more particularly to a rotary piston engine which constitutes an improvement over the engine disclosed in my U.S. Patent No. 2,969,049.

An important object of the invention is to provide a rotary piston engine which may operate on the diesel principle or as an Otto engine, and wherein the various working chambers and compartments may be completely sealed from each other when the operating conditions necessitate such sealing negardless of the pressures prevailing in such chambers.

Another object of the invention is to provide an engine of the just outlined characteristics wherein the compressor which delivers air to the combustion chambers forms a compact unit with the remaining parts of the engine.

A further object of my invention is to provide a rotary piston engine of the above described type wherein the system which drives the air compressor may simultaneously serve as a means for circulating a lubricant to the rotary components of the engine.

An additional object of the instant invention is to provide an engine of the just outlined characteristics wherein the lubricant circulating system may simultaneously perform the function of coolant circulating means so that the number of parts utilized for driving the air compressor, for circulating the lubricant and for cooling the engine is reduced to a minimum.

Still another object of the invention is to provide a rotary piston engine of the above described character wherein the lubricant may simultaneously serve as a coolant for the rotary components of the engine, particularly for such components which define or are adjacent to the combustion and expansion chambers.

With the above objects in view, the invention resides in the provision of a rotary piston engine which comprises a casing defining an internal cylinder space receiving a portion of a coaxial output shaft which carries a cylindrical eccentric for the hub of a rotary piston provided with a radially outwardly extending arm slidable in a composite cylindrical follower received in an accentric bore provided in an annular rotary member installed in the cylinder space and surrounding the hub of the rotary piston so as to define therewith a substantially crescent-shaped expansion chamber for the products of combustion. The engine further comprises a transmission which drivingly connects the rotary member with the output shaft so that the shaft and the rotary member rotate in opposite directions when the rotary member and the piston are driven by combustion products admitted from the conmbustion chambers to the expansion chamber.

Certain other features of the invention reside in special construction of the transmission which enables the hub of the rotary piston to roll twice along the internal surface of the rotary member while the latter completes a full revolution, in special construction of the rotary member so that the latter may receive a large quantity of coolant in order to lead away the heat developing as a result of fuel combustion and of admission of combustion products into the expansion chamber, in the provision of a special compressor which is driven by the rotary member and whose drive preferably constitutes a gear pump adapted to circulate lubricant in the engine as well as to circulate the coolant in the interior of the rotary member, and in special construction of the means for admitting air into and for withdrawing combustion products from the expansion chamber.

The novel features which are considered as characteristic of the invention are set forth in particular in the appended claims. The invention itself, however, both as to its construction and its method of operation, together with additional objects and advantages thereof, will be best understood from the following detailed description of a specific embodiment with reference to the accompanying drawings, in which:

FIGS. 3 through 10 are smaller-scale transverse sections through the cylinder and the rotary member of the engine with certain parts omitted, showing eight different angular positions of the rotary member which this member assumes while completing a single revolution.

Figure 1:
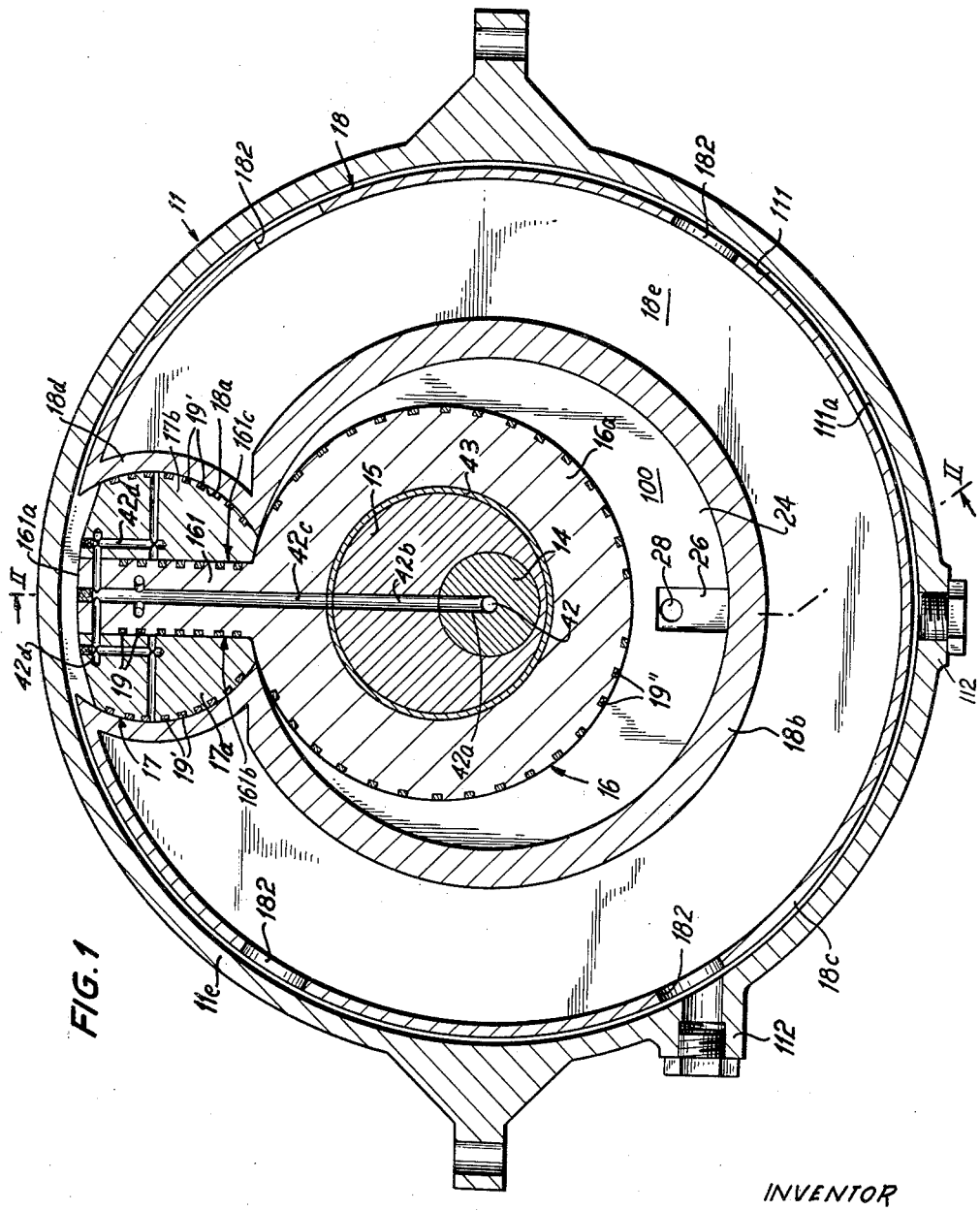
FIG. 1 is a transverse section through the casing and through the rotary member of a rotary piston engine which embodies my invention, the section of FIG. 1 being taken in the direction of arrows as seen from the line I—I of FIG. 2.
Figure 2:
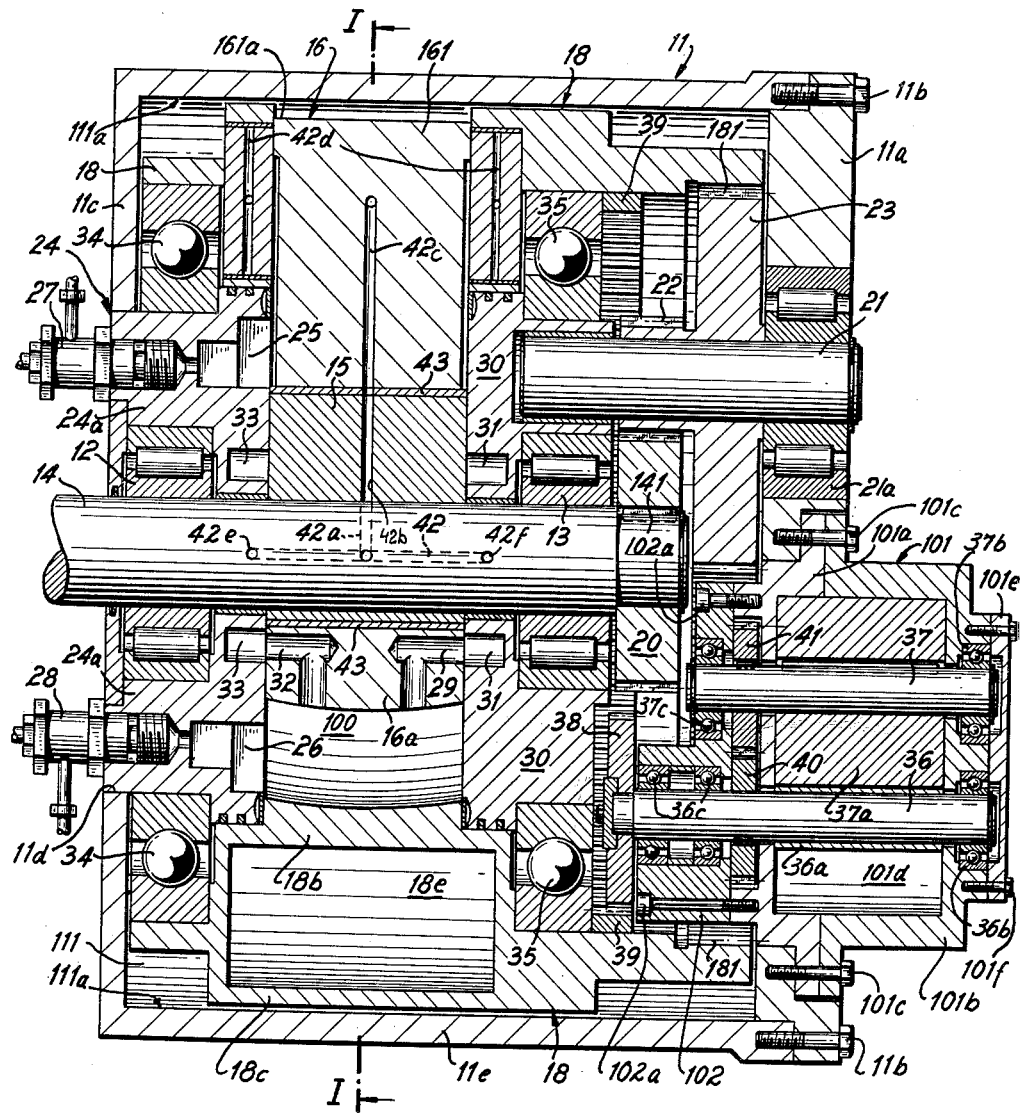
FIG. 2 is an axial section through the rotary piston engine as seen in the direction of arrows from the line II—II of FIG. 1.

Referring now in greater detail to the illustrated embodiment and first to FIGS. 1 and 2, there is shown a rotary piston engine which comprises a cupped cylindrical casing 11 having an open end which is sealed by a cover 11a secured thereto by bolts 11b. The bottom end wall 11c of the casing 11 is formed with a large bore 11b through which extends the rotary output shaft 14, the latter mounted in spaced radial roller bearings 12 and 13. The axis of the shaft 14 coincides with the axis of the casing 11. The shaft 14 extends into the internal cylinder space 111 of the casing 11 and is connected in this space with a larger-diameter cylindrical eccentric 15 non-rotatably secured thereto by a key 15a (see FIGS. 3 to 10). The eccentric 15 is received in a cylindrical bearing sleeve 43 (shown only in FIGS. 1 and 2) which is surrounded by the cylindrical hub 16a of a rotary piston 16, the latter having a radially outwardly extending arm 161 whose front end face 161a is adjacent to the cylindrical internal surface 111a bounding a portion of the cylinder space 111. The lateral faces 161b, 161c, of the arm 161 are slidably engaged by the flat internal surfaces of a composite cylindrical follower or coupling 17 which consists of two substantially semicylindrical portions 17a, 17b respectively adjacent to the lateral faces 161b, 161c. The arcuate peripheral faces of the follower portions 17a, 17b are received in a complementary eccentric bore 18a provided in a twin-walled annular rotary member 18 which is rotatably received in the cylinder space 111 and which is rotatably guided by selected portions of the internal surface 111a in the casing 11. The common axis of the bore 18a and of the composite follower 17 is parallel with the axis of the output shaft 14. The rotary member 18 is mounted on two radial ball bearings 34, 35 and the radial arm 161 of the rotary piston 16 is axially reciprocable with respect to and between the portions 17a, 17b of the follower 17 which latter in turnable in the rotary member 18. The lateral faces 161b, 161c of the arm 161, the peripheral faces of the follower portions 17a, 17b, and the periphery of the hub 16a are respectively provided with recesses for axially parallel sealing strips or laminations 19, 19', 19". These strips insure that the arm 161 may sealingly engage with the flat internal surfaces of the follower portions 17a, 17b, that the peripheries of the follower portions sealingly engage with the wall bounding the eccentric bore 18a of the rotary member 18, and that the hub 16a sealingly engages with the internal surface of the inner cylinder 18b forming part of the rotary member 18. This inner cylinder is coaxial with an outer cylinder 18c which latter is rotatable along the internal surface 111a of the casing 11.

The periphery of the hub 16a and the internal surface of the inner cylinder 18b define between themselves a crescent-shaped expansion chamber 100 whose axial ends are respectively sealed by end plates 24, 30. The front end plate 24 is received in the left-hand axial end of the rotary member 18, as viewed in FIG. 2, and is provided with a coaxial extension 24a projecting into the bore 11d. This extension 24a is surrounded by the ball bearing 34 for the rotary member 18 and receives therewithin the roller bearing 12 for the output shaft 14. The front end plate 24 actually forms a wall portion of the casing 11 and its inner side is adjacent to the chamber 100. The rear end plate 30 is surrounded by the second ball bearing 35 for the rotary member 18 and is formed at its outer side with a coaxial recess which accommodates the second roller bearing 13 for the output shaft 14. The total volume of the crescent-shaped expansion chamber 100 remains substantially unchanged but the arm 161 and the hub 16a of the piston 16 divide this chamber into a pair of separated zones during certain stages of operation. This will be described in connection with FIGS. 3 to 10.

The piston 16 and the rotary member 18 are driven with respect to each other by a transmission which is accommodated in the casing 11 intermediate the cover 11a and the rear end plate 30. The output shaft 14 comprises a smaller-diameter end portion 141 which projects outwardly beyond the rear end plate 30 and is keyed to a spur gear 20 which meshes with a pinion 22 mounted on an intermediate shaft 21. One end of this intermediate shaft is rotatably received in a roller bearing 21a provided in the cover 11a, and its other end extends into a blind bore formed in the outer side of the rear end plate 30. The pinion 22 is rigid or integral with a larger-diameter spur gear 23 whose teeth mesh with the teeth of an internal ring gear 181 connected to or integral with the right-hand axial end of the rotary member 18, as viewed in FIG. 2. The circumference of the pitch circle of the pinion 22 equals one-half the circumference of the pitch circle of the gear 20, and the ratio is the same between the pitch circle of the gear 23 and that of the internal gear 181. The just described transmission causes the output shaft 14 and the eccentric 15 to rotate in anti-clockwise direction when the rotary member 18 and the piston 16 rotate in clockwise direction, or vice versa. Also, owing to the above-mentioned transmission ratio between the elements of the gear train 20, 21, 23, 181, the cylindrical periphery of the hub 16a completes two full revolutions by rolling along the cylindrical internal surface of the inner cylinder 18 in the direction in which the output shaft 14 rotates during each full revolution of the rotary member 18. During such rolling movement of the hub 16a, the strips 19″ sealingly engage the internal surface of the inner cylinder 18b.

As can be observed in FIGS. 3, 5, 7 and 9, during each full revolution of the rotary member 18 the piston 16 assumes four times a position in which the longitudinal axis of its arm 161 extends in radial direction of the casing 11, i.e. the axis and the longitudinal symmetry plane of the arm 161 then intersect the axis of the output shaft 14. Diametrically opposite the axis of the output shaft 14 and substantially midway between the periphery of this shaft and the internal surface 111a of the casing 11, the front end plate 24 is provided with a pair of axially parallel cylindrical combustion chambers 25, 26 whose axes are located in the symmetry plane of the arm 161 when the piston 16 assumes the position of FIGS. 3 or 7. The chambers 25, 26 are formed in the inner side of the end plate 24, i.e. in that side which is adjacent to the expansion chamber 100. The combustion chambers 25, 26 respectively communicate with the orifices of fuel injection nozzles 27, 28 which are screwed into the outer side of the front end plate 24. When the hub 16a of the rotary piston 16 rolls along the internal surface of the inner cylinder 18b, it partially screens at least one of the combustion chambers 25, 26 to a certain extent so that the combustion chambers may communicate with the expansion chamber 100 only during certain stages of the operation. For example, in the position which the rotary piston 16 assumes in FIGS. 5 and 9, the discharge ends of the combustion chambers 25, 26 are nearly fully exposed.

The means for admitting oxygen or oxygen-containing air to the expansion chamber 100 and hence to the combustion chambers 25, 26 comprises an L-shaped duct 29 whose intake portion extends inwardly from that end face of the piston 16 which is adjacent to the inner side of the end plate 30 and whose outlet portion discharges into the expansion chamber 100 radially through the periphery of the hub 16a. The intake portion of the duct 29 communicates with a port 31 formed in the inner side of the rear end plate 30 and shaped in such a way that the duct remains in communication therewith during a certain stage of operation, i.e. while the hub 16a of the piston 16 rolls through a certain angle along the internal surface of the inner cylinder 18b. The port 31 is connected to a source of oxygen, preferably an air compressor, and preferably assumes the shape of a kidney. In FIG. 2, the piston 16 is shown in an angular position in which its duct 29 communicates with the port 31 so that air may flow into the expansion chamber 100.

Combustion products may be expelled from the expansion chamber 100 through a second L-shaped duct 32 whose intake portion extends radially inwardly from the periphery of the hub 16a and whose axially parallel outlet portion extends to the left-hand end face of the piston 16, as viewed in FIG. 2. This outlet portion of the duct 32 may communicate with a kidney-shaped port 33 formed in the inner side of the front end plate 24. The ducts 29, 32 are arranged in mirror symmetry with respect to a plane perpendicular to the axis of the output shaft 14 and passing centrally between the parallel end faces of the piston 16. The arrangement is such that the outlet portion of the duct 32 communicates with the port 33 when the inlet portion of the duct 29 is free to receive air from the port 31. The port 33 communicates with the atmosphere so that compressed air entering through the duct 29 may expel the combustion products from the expansion chamber 100. The kidney-shaped ports 31, 33 render it possible that the entry of air and simultaneous expulsion of combustion products from the chamber 100 may take place during a certain period of time while the hub 16a rolls along the inner cylinder 18b.

The means for delivering air to the port 31 comprises a compressor or blower whose composite housing 101 comprises two cupped sections 101a, 101b. The open ends of these sections are formed with abutting external flanges which are secured to the cover 11a by means of bolts 101c in such a way that the section 101a extends through a bore in the cover and partially into the compartment between the cover and the rear end plate 30 which compartment accommodates the aforementioned transmission including the gear train 20, 22, 23, 181. The sections 101a, 101b define between themselves a compressing compartment 101d which accommodates two bladed or vaned wheels 36a, 37a adapted to draw air into this compartment and to expel compressed air through a non-illustrated channel into the port 31. The wheels 36a, 37a, are respectively keyed to parallel shafts 36, 37 which are rotatably mounted in the end walls of the sections 101a, 101b. The right-hand ends of these shafts, as viewed in FIG. 2, are mounted in radial ball bearings 36b, 37b recessed into the outer side of the end wall forming part of the section 101b and retained therein by a lid 101e which is secured to the section 101b by bolts 101f. The left-hand end face of the section 101a is formed with an elongated recess which accommodates two meshing spur gears 40, 41 which are respectively mounted on the shafts 36, 37 so that it is sufficient to drive one of these shafts in order to rotate the other shaft through the gears 40, 41. The left-hand ends of the shafts 36, 37 extend beyond the gears 40, 41 and are rotatably mounted in radial ball bearings 36c, 37c provided in a bearing plate 103 which is secured to the section 101a by bolts 102a. The shaft 36 is longer than the shaft 37 and its smaller-diameter left-hand end portion extends beyond the bearing plate 102 and is secured to a pinion 38 which meshes with a second internal ring gear 39 of the rotary member 18. In FIG. 2, the ring gear 39 is shown as a separate component which is secured to the rotary member 18 inwardly of the ring gear 181, but it is equally possible to form the gear 39 as an integral part of the rotary member. When the member 18 rotates, the pinion 38 drives the shaft 36 and the latter's gear 40 drives the shaft 37 through the gear 41 so that the vanes of the wheels 36a, 37a may draw air into the compressing compartment 101d and may deliver compressed air to the port 31. If desired, the drive means 38, 39 for the wheels 36a, 37a of the compressor may be replaced by a different drive which receives rotary motion from the ring gear 181.

The gears 40, 41, the section 101a, and the bearing plate 102 constitute a gear pump which is utilized to deliver lubricant to the rotary components of the engine through channels 42–42f shown in FIGS. 1 and 2. Thus, this gear pump including the gears 40, 41 may deliver lubricant through the coaxial channel 42 of the output shaft 14, thence through a radially extending channel 42a of this shaft, then through a radially extending channel 42b of the eccentric 15, through a radially extending channel 42c of the arm 161, and through a series of channels 42d in the follower portions 17a, 17b so that the lubricant may coat the periphery of the output shaft, the bearing sleeve 43, as well as the internal surfaces and the peripheral faces of the follower portions. Additional radial channels 42e, 42f may be provided in the shaft 14 to deliver lubricants to the bearing sleeves surrounding two spaced portions of the output shaft which respectively extend through the end plates 24, 30 (see FIG. 2).

The engine of my invention may be cooled as follows: The cylinders 18b, 18c and that portion (18d) of the rotary member 18 which surrounds the follower portions 17a, 17b define between themselves a nearly cylindrical cooling compartment 18e which communicates with spaced apertures 182 provided in the outer cylinder 18c. The cylindrical portion 11e of the casing 11 is provided with one or more sealable filling nipples 112 through which the coolant may be admitted to the internal chamber 111 and thence through the apertures 182 into the cooling compartment 18e. The coolant is preferably a lubricant, e.g. oil, and is circulated by the afore-mentioned gear pump including the gears 40, 41.

The operation of the improved rotary piston engine will be described with reference to FIGS. 3 to 10, and it is assumed that the engine operates on the diesel principle. For the sake of simplicity, FIGS. 3 to 10 show the rotary member 18 without the cooling compartment 18e.

The arrow 103 in FIG. 3 indicates that the rotary member 18 turns in clockwise direction; it follows that the gear train 20, 22, 23, 181 drives the output shaft 14 and the eccentric 15 in anticlockwise direction (arrow 103a). In the position of FIG. 3, the combustion chamber 25 is sealed from the expansion chamber 100 by the hub 16a of the piston 16 which means that air entrapped in the chamber 25 is subjected to maximum compression. As the arm 161 follows the clockwise angular movement of the member 18, the hub 16a begins to progressively expose the combustion chamber 25 so that the combustion products formed upon injection and automatic ignition of fuel in the highly compressed and highly heated air in the chamber 25 may enter the smaller but progressively increasing zone 100a of the expansion chamber, see FIG. 4. The products of combustion are indicated with dots. The injection of fuel into the combustion chamber 25 by the nozzle 27 takes place at a time when the arm 161 of the piston 16 assumes or is near to the position of FIG. 4, whereby the combustion products penetrating into and expanding in the zone 100a cause the arm 161 and the rotary member 18 to rotate in clockwise direction toward the position of FIG. 5. During such clockwise rotation, the piston 16 is compelled by the eccentric 15 and by the follower portions 17a, 17b to roll along the internal surface of the member 18 so that the volume of the zone 100a increases at the same rate at which the volume of the remaining zone 100b of the expansion chamber 100 decreases.

In the position of FIG. 5, the rotary member 18 has completed one quarter of a full revolution so that the volume of the zone 100a equals the volume of the other zone 100b. The expanding combustion products still continue to drive the arm 161 and the member 18 in clockwise direction, and the arm presents a progressively increasing portion of its left-hand lateral face 161b to the action of combustion products whereby the pressure of combustion products per unit area of the lateral face 161b decreases at the same rate at which the exposed portion of this lateral face increases. The piston 16 then reaches the position of FIG. 6 in which the right-hand lateral face 161c of the arm 161 expels fresh air from the progressively diminishing zone 100b into the combustion chamber 26 until the volume of the zone 100b is reduced to zero (FIG. 7) and the highly compressed and heated air entrapped in the chamber 26 is sealed from the expansion chamber 100 by the arm 161. The duct 29 begins to communicate with the air admitting port 31 shortly before the piston 16 and the rotary member 18 reach the position of FIG. 3. At the same time, the duct 32 begins to communicate with the port 33 so that spent combustion products filling the zone 100b of the expansion chamber 100 are expelled from this zone by compressed air delivered from the chamber 101d, and the zone 100b is filled with oxygen-containing air at the time the arm 161 moves to the position of FIG. 4. This explains the presence of air in the zone 100b in the position which the parts of the engine assume in FIG. 6 and subsequent expulsion of air into the combustion chamber 26 (FIG. 7). The flow of fresh air in indicated in FIGS. 3 and 7 by short arrows 104.

Shortly before the arm 161 reaches the position of FIG. 7, the duct 29 again communicates with the port 31 so that fresh air delivered by the compressor may flow into the zone 100a whose volume now equals the total volume of the expansion chamber 100, and the air admitted through the duct 29 expels spent combustion products through the duct 32 and port 33. When the arm 161 moves between the positions of FIGS. 7 and 8, i.e. when the combustion chamber 26 begins to communicate with the progressively increasing zone 100b, the nozzle 28 injects atomized fuel into the chamber 26 and the fuel is ignited in a fully automatic way so that the products of combustion developing on ignition of fuel enter into and expand in the zone 100b to act against the lateral face 161b of the arm 161 and to drive the piston 16 with the rotary member 18 in clockwise direction. When the piston 16 assumes the position of FIG. 8, fresh air admitted through the duct 29 has already expelled all combustion products from the progressively decreasing zone 101a, i.e. as the volume of the zone 100a decreases the air filling this zone is subjected to increasing compression and is forced to enter the combustion chamber 25 while the arm 161 advances through the positions of FIGS. 8, 9 and 10 toward the position of FIG. 3. It will be noted that the engine of my invention is a two-stroke engine because fuel is injected and combusted twice during each full revolution of the rotary member 18. While the arm 161 travels from the position of FIG. 8 through the positions of FIGS. 9, 10 and back to the position of FIG. 3, the volume of the zone 100a is gradually reduced to zero because the arm seals the combustion chamber 25 (and the compressed air entrapped therein) from the expansion chamber 100 as soon as or shortly before the piston 16 and the rotary member 18 reach the position of FIG. 3. The cycle is then repeated in the same manner and the combustion products alternately admitted to and expanding in the zones 100a, 100b, continue to drive the rotary member 18 in the clockwise direction which results in higher-speed anticlockwise rotation of the output shaft 14. The compressor including the wheels 36a, 37a and the pump including the gears 40, 41 begin to operate as soon as the member 18 is set in rotary motion whereby the engine is supplied with fresh air and is also lubricated as well as cooled as long as the rotary member remains in motion.

The axis of the output shaft 14 is located in the radial symmetry plane P—P of the arm 161 four times during each full revolution of the rotary member 18 (FIGS. 3, 5, 7 and 9), and the axes of the combustion chambers 25, 26 are located in the symmetry plate P—P simultaneously with the axis of the shaft 14 after each half revolution of the member 18 (FIGS. 3 and 7).

The means for operating the nozzles 27, 28 in the above described sequence preferably assumes the form as disclosed in my aforementioned Patent 2,969,049, i.e. the output shaft 14 may be provided with suitable cams which control the timing of fuel injection into the chambers 25, 26.

Of course, the engine may be adapted to operate as an Otto engine merely by combining it with an ignition system and by reducing the compression of air in the chambers 25, 26.

Without further analysis, the foregoing will so fully reveal the gist of the present invention that others can, by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is:

1. In a rotary piston engine, in combination, a casing defining an internal cylinder space; a rotary output shaft coaxially extending into said space; an eccentric fixed to said shaft and located in said space; a rotary piston having a hub coaxially surrounding said eccentric and a radial arm; an annular rotary member received in said space and coaxial with said shaft, said rotary member disposed about and defining with said hub an expansion chamber; follower means for articulately coupling said rotary member with said arm so that the piston is movable substantially radially with respect to said rotary member when the output shaft rotates said eccentric; and transmission means for drivingly connecting said rotary member with said shaft so that the shaft and the rotary member rotate in opposite directions.

2. In a rotary piston engine, in combination, a casing defining an internal cylinder space; a rotary output shaft coaxially extending into said space; a cylindrical eccentric fixed to said shaft and located in said space; a rotary piston having a hub coaxially surrounding said eccentric and a radially outwardly extending arm, said hub having a cylindrical periphery; an annular rotary member received in said space and coaxial with said shaft, said rotary member having a cylindrical internal surface disposed about and defining with said hub a substantially crescent-shaped expansion chamber, the periphery of said hub sealingly engaging the internal surface of said rotary member; follower means for articulately coupling said rotary member with said arm so that the piston is movable substantially radially with respect to said rotary member and the periphery of said hub rolls along the internal surface of said rotary member when the output shaft rotates said eccentric; and transmission means for drivingly connecting said rotary member with said shaft so that the shaft and the rotary member rotate in opposite directions.

3. A combination as set forth in claim 2, wherein the ratio of the diameter of said periphery to the diameter of said internal surface is such that the hub of said rotary piston rolls twice along said internal surface during each full revolution of said rotary member.

4. A combination as set forth in claim 3, further comprising sealing means recessed into said piston and into said follower means.

5. In a rotary piston engine, in combination, a casing defining an internal cylinder space; a rotary output shaft coaxially extending into said space; an eccentric fixed to said shaft and located in said space; a rotary piston having a hub coaxially surrounding said eccentric and a radial arm; an annular rotary member received in said space and coaxial with said shaft, said rotary member disposed about and defining with said hub an expansion chamber; follower means for articulately coupling said rotary member with said arm so that the piston is movable substantially radially with respect to said rotary member when the output shaft rotates said eccentric; and transmission means for drivingly connecting said rotary member with said shaft so that the shaft and the rotary member rotate in opposite directions, said transmission means comprising a first gear fixed to said output shaft, a second gear meshing with said first gear, a third gear coaxial with and rigidly secured to said second gear, and an internal ring gear rigid with said rotary member and meshing with said third gear, the circumference of the pitch circles of said second and third gears respectively equal to one-half the circumference of the pitch circles of said first gear and said ring gear.

6. A combination as set forth in claim 5, wherein said casing has an open end and further comprising cover means sealingly secured to said open end and an end plate mounted in said casing inwardly of said cover means, said transmission further comprising an intermediate shaft parallel with said output shaft and rotatably mounted in said cover means and in said end plate, said second and third gears coaxially mounted on said intermediate shaft.

7. In a rotary piston engine, in combination, a casing defining an internal cylinder space; a rotary output shaft coaxially extending into said space; a cylindrical eccentric fixed to said shaft and located in said space; a rotary piston having a hub coaxially surrounding said eccentric and a radial arm; an annular rotary member received in said space and coaxial with said shaft, said rotary member disposed about and defining with said hub an expansion chamber, said casing comprising a wall portion having an inner side adjacent to said expansion chamber and said wall portion having two combustion chambers extending inwardly from said inner side and disposed at diametrically opposite sides of the axis of said shaft; nozzle means mounted in said wall portion for injecting fuel into said combustion chambers; composite cylindrical follower means turnably mounted in said rotary member for rotation about an axis which is spaced from and parallel with the axis of said output shaft, said follower means slidably engaging with the arm of said piston so that the piston is movable substantially radially with respect to said rotary member when the output shaft rotates said eccentric; and transmission means for drivingly connecting said rotary member with said shaft so that the shaft and the rotary member rotates in opposite directions, the diameter of said hub being such that it at least partially seals at least a portion of at least one of said combustion chambers from said expansion chamber in each angular position of said rotary member.

8. A combination as set forth in claim 7, wherein said arm has a central plane of symmetry and the axis of said output shaft is located in said plane four times during each revolution of said rotary member, the axes of said combustion chambers being located in said plane simultaneously with the axis of said output shaft after each half revolution of said rotary member.

9. In a rotary piston engine, in combination, a casing defining an internal cylinder space; a rotary output shaft coaxially extending into said space; an eccentric fixed to said shaft and located in said space; a rotary piston comprising a hub coaxially surrounding said eccentric and a radially outwardly extending arm, said piston having two parallel end faces disposed in planes perpendicular to the axis of said shaft; an annular rotary member received in said space and coaxial with said shaft, said hub disposed within and defining a substantially crescent-shaped expansion chamber with said rotary member and the latter having an eccentric bore whose axis is parallel with the axis of said shaft; a composite follower including two substantially semicylindrical portions turnably received in said bore and disposed at the opposite sides of said arm so that the arm is slidable between said follower portions when the output shaft rotates said eccentric; transmission means for drivingly connecting said rotary member with said shaft so that the shaft and the rotary member rotate in opposite directions; a source of compressed air; and a pair of spaced end plates each having an inner side adjacent to an end face of said piston, each of said end plates having port means extending inwardly from said inner side thereof and respectively communicating with said source and with the atmosphere, said piston having first and second duct means extending inwardly from the opposite end faces thereof and in permanent communication with said expansion chamber, one of said duct means communicating with the port means of one of said end plates and the other duct means communicating with the port means of the other end plate during a portion of each revolution which said piston describes with said rotary member.

10. A combination as set forth in claim 9, wherein said source of compressed air is an air compressor comprising a housing at least partially extending into said casing, a pair of cooperating rotary vaned wheels in said housing, and drive means including an internal ring gear rigid with said rotary member for rotating said wheels.

11. A combination as set forth in claim 10, wherein said drive means further comprises a pair of meshing gears constituting a gear group, and further comprising a supply of lubricant filling said cylinder space and recirculated by said gear group through channel means formed in said output shaft, in said eccentric, in said arm and in said follower for lubricating the periphery of said shaft, of said eccentric and of said follower and the arm of said piston.

12. A combination as set forth in claim 9, wherein said rotary member comprises an inner cylinder and an outer cylinder coaxially surrounding said inner cylinder, said cylinders defining between themselves a coolant-receiving compartment.

13. A combination as set forth in claim 12, wherein said cylinder space contains a supply of coolant and said outer cylinder has at least one aperture through which the coolant may circulate between said space and said compartment.

14. A combination as set forth in claim 13, wherein said source of compressed air is a compressor comprising a gear pump driven by said rotary member for recirculating the coolant in said compartment.

15. A combination as set forth in claim 9, wherein the inner side of one of said end plates is formed with a pair of spaced combustion chambers disposed at diametrically opposite sides of said output shaft and adapted to communicate with said expansion chamber in predetermined angular positions of said piston with respect to said casing, said port means located nearer to the axis of said output shaft than said combustion chambers, and nozzle means for injecting fuel into said combustion chambers.

16. A combination as set forth in claim 9, wherein said ports are kidney-shaped and said ducts extend from the respective end face of said piston to the periphery of said hub.

17. In a rotary piston engine, in combination, a casing defining an internal cylinder space; a rotary output shaft coaxially extending into said space; an eccentric fixed to said shaft and located in said space; a rotary piston having a hub coaxially surrounding said eccentric and a radial arm; an annular rotary member received in said space and coaxial with said shaft, said rotary member disposed about and defining with said hub an expansion chamber; follower means for articulately coupling said rotary member with said arm so that the piston is movable substantially radially with respect to said rotary member when the output shafts rotates said eccentric; and transmission means for drivingly connecting said rotary member with said shaft so that the shaft and the rotary member rotate in opposite directions and that the shaft is rotated at twice the speed of said rotary member, the internal diameter of said rotary member and the diameter of said hub being such that the hub rolls twice along said rotary member while the latter completes a full revolution.

18. In a rotary piston engine, in combination, a casing defining an internal cylinder space; a rotary output shaft coaxially extending into said space; a cylindrical-eccentric fixed to said shaft and located in said space; a rotary piston having a hub coaxially surrounding said eccentric and a radially outwardly extending arm having a pair of parallel lateral faces; said hub having a cylindrical periphery; a plurality of spaced axially parallel sealing strips recessed into said lateral faces and into the periphery of said hub; an annular rotary member received in said space and coaxial with said shaft, said rotary member having a cylindrical internal surface disposed about and defining with said hub a substantially crescent-shaped expansion chamber, the periphery of said hub sealing engaging the internal surface of said rotary member; follower means for articulately coupling said rotary member with said arm so that the piston is movable substantially radially with respect to said rotary member and the periphery of said hub rolls along the internal surface of said rotary member when the output shaft rotates said eccentric, said follower means comprising a pair of spaced substantially semicylindrical portions each having a flat inner surface adjacent to one lateral face of said arm and a peripheral face turnably received in said rotary member; a plurality of axially parallel sealing strips recessed into the peripheral faces of said follower portions; and transmission means for drivingly connecting said rotary member with said shaft so that the shaft and the rotary member rotate in opposite directions.

No references cited.